C. F. GREENMAN.
STOVE-LID.
No. 174,807. Patented March 14, 1876.
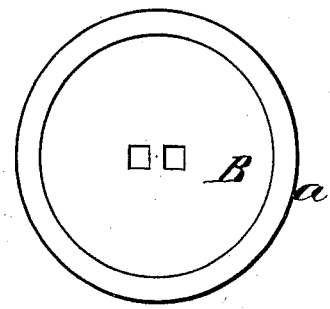
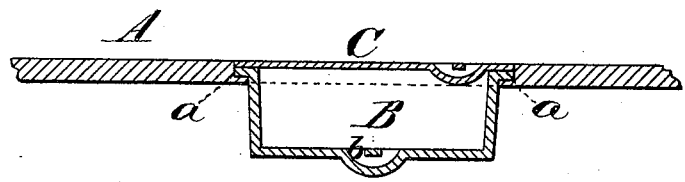
WITNESSES
M. P. Utley.
George E. Upham.
INVENTOR,
Charles F. Greenman.
Gilmore, Smith & Co.
ATTORNEYS.

UNITED STATES PATENT OFFICE.

CHARLES F. GREENMAN, OF GREEN, IOWA, ASSIGNOR OF ONE-HALF HIS RIGHT TO S. W. SOESBE, OF SAME PLACE.

IMPROVEMENT IN STOVE-LIDS.

Specification forming part of Letters Patent No. 174,807, dated March 14, 1876; application filed February 19, 1876.

*To all whom it may concern:*

Be it known that I, CHARLES F. GREENMAN, of Green, in the county of Butler and State of Iowa, have invented a new and valuable Improvement in Stove-Lids; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my stove-lid, and Fig. 2 is a longitudinal vertical sectional view thereof.

This invention has relation to means for preventing the escape of smoke into the room when a pot-hole cover is removed, and also for preventing the bottoms of pots from being smoked, as will be hereinafter explained.

In the annexed drawings, A designates the top plate of a cook-stove, and B designates a deep dish, the upper edge of which is flanged, as shown at $a$, which flange is received in an annular groove made in the plate A, and sustains the dish in its proper place. The groove or rabbet in the stove-plate is deeper than the thickness of the flange $a$, so that when the pot-hole cover C is in its place it will be flush with the surface of the plate A.

The dish B may be made of any desired depth, and in its bottom a depression, $b$, is made, crossed by a bridge, for the purpose of receiving a handle with which to lift the dish out of the plate-hole.

It will be seen from the above description that the pan B will protect the bottom of a pot or kettle from flame and smoke, and will prevent smoke from entering a room when the pot-hole cover is removed.

What I claim as new, and desire to secure by Letters Patent, is—

The depressed disk B, flanged, and combined with the pot-hole and its cover, substantially as described.

In testimony that I claim the above I have hereunto subscribed my name in the presence of two witnesses.

CHARLES F. GREENMAN.

Witnesses:
G. C. THOMAS,
S. THOMAS.